Figure 1:
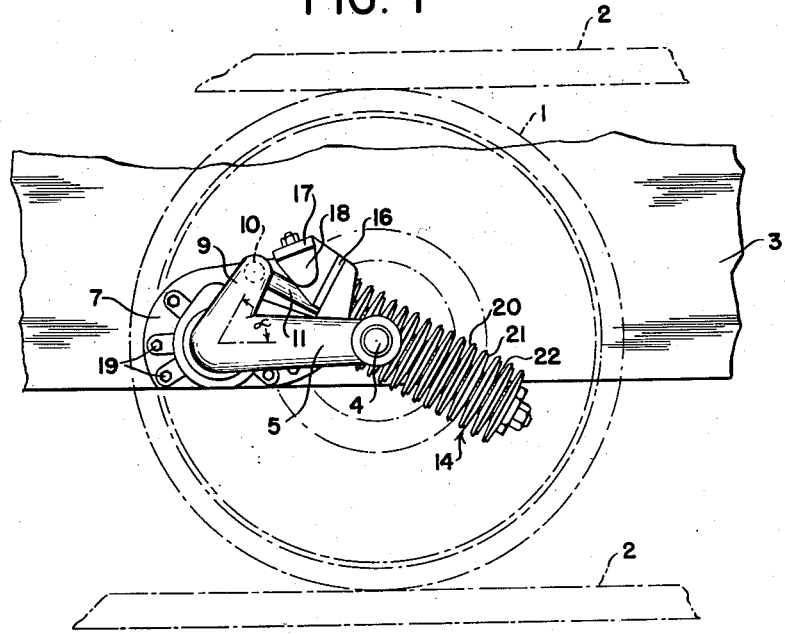

INVENTOR
Wolfgang Eyb

June 10, 1958 W. EYB 2,838,344
BOGIE-WHEEL SUSPENSION FOR TRACKED VEHICLES
Filed June 23, 1955 2 Sheets-Sheet 2

INVENTOR
Wolfgang Eyb
BY
ATTORNEYS

United States Patent Office 2,838,344
Patented June 10, 1958

2,838,344

BOGIE-WHEEL SUSPENSION FOR TRACKED VEHICLES

Wolfgang Eyb, Stuttgart, Zuffenhausen, Germany, assignor to Porsche System Engineering Ltd., Zug, Switzerland Application June 23, 1955, Serial No. 517,619

Claims priority, application Switzerland July 2, 1954

4 Claims. (Cl. 305—9)

This invention relates to improvements in suspension mechanisms for the bogie-wheels of tracked vehicles.

An object of the invention is to provide a suspension for the bogie-wheels of tracked vehicles, including elements which are disposed in a substantially protected position within the bogie-wheels.

Another object of the invention is to provide a bogie-wheel suspension mechanism which may be dismantled as a unit from the body of the vehicle.

Constructions are known in which bogie-wheels are guided by means which swing in the direction of travel and which are yieldingly supported by coil or cylindrical springs. In order to obtain a sufficient swing action amplitude in these constructions, particularly in the case of heavy vehicles, these springs must be made relatively long and wide so that they cannot be located in a protected position within the bogie-wheels themselves, or at least not without making use of special structural parts which would greatly increase the cost of production of the vehicle.

These and other disadvantages are obviated in accordance with the invention by providing a suspension and guiding means which swings longitudinally or in the direction of travel and supporting the guiding means yieldably by means of plate springs forming a spring pack inclined with respect to the track. By use of this construction it is possible to position the entire wheel suspension and supporting means as well as the spring in a space defined by the bogie-wheel, and within the confines of the bogie-wheel to thereby protect them effectively against damage.

According to the invention, the plate springs are assembled on a tie-rod connected with an arm of the suspension means extending parallel to the pivot axis of the suspension, the suspension mechanism preferably including a second arm angularly disposed with respect to the first arm and carrying the bogie-wheel. In this construction a favorable spacial arrangement is obtained, for example, by assembling the plate springs into a spring pack for each bogie-wheel and arranging the pack to form right angles with respect to the arm of the suspension means extending parallel to the pivot axis thereof. This arrangement is particularly advantageous when the arm carrying the spring pack defines an angle of from about 60 to 65° with respect to the arm carrying the bogie-wheel.

The suspension mechanism is mounted on the side wall of the vehicle by means of a bearing block which serves as a back stop for the plate spring pack and also as a bearing for the wheel-guiding means. The bearing block, suspension mechanism and spring suspension mechanism, including the spring pack and the bogie-wheel, comprise an assembly which is readily removable from the body of the vehicle by merely loosening the bearing block, thereby enabling one to readily replace the entire aggregate with a new bogie-wheel unit and suspension.

Figure 2:
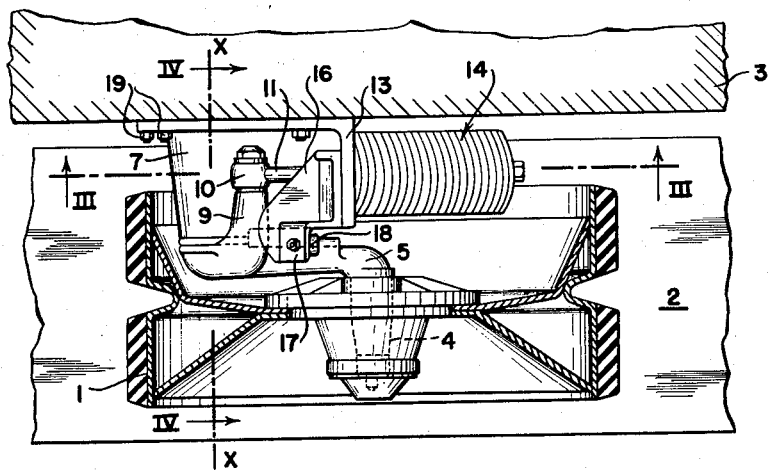
Figure 3:
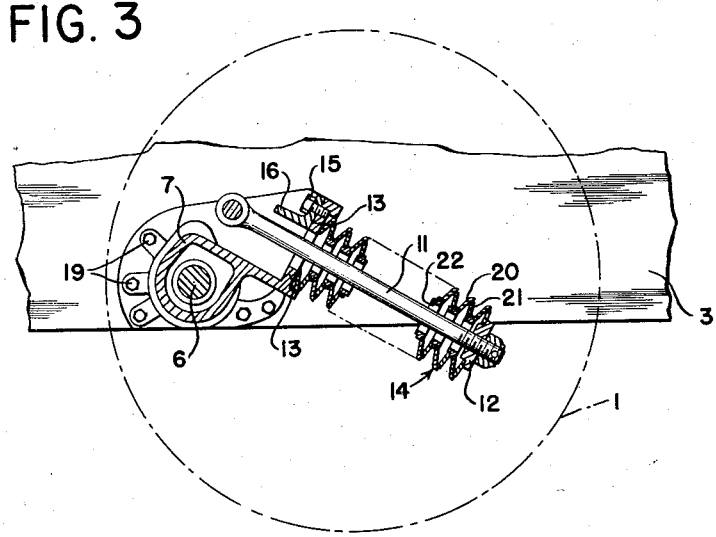
Figure 4:
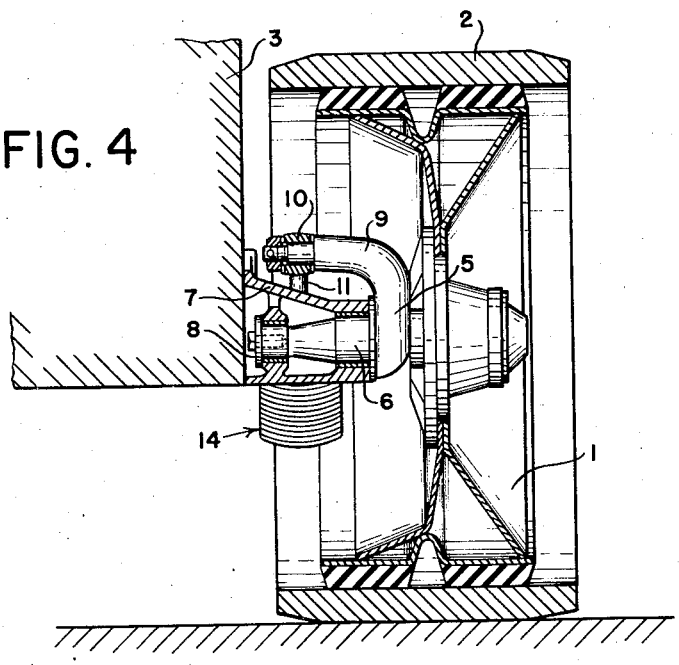

In the drawings which illustrate one exemplifying form or embodiment of the invention, Fig. 1 is a side view of a bogie-wheel suspension in accordance with the invention with the bogie-wheel removed in order to show the suspension means more clearly, the bogie-wheel and upper and lower runs of the track being indicated by dashed lines;

Fig. 2 is a top plan view of the bogie-wheel suspension, the wheel being shown partly in section, Fig. 3 is a longitudinal sectional view along line III—III of Fig. 2, and Fig. 4 is a vertical sectional view through the suspension taken along line IV—IV of Fig. 2, the wheel being shown partly in section.

The tracked vehicle comprises several bogie-wheels 1 situated one behind the other in the direction of travel of the vehicle and an endless track 2 (shown diagrammatically) placed over and under the bogie-wheels. Each of the bogie-wheels is fastened in the same manner to one side wall 3 of the vehicle frame, for which reason only one wheel and its suspension means is shown and described.

The bogie wheel 1 is journaled in a known manner on an offset arm or stub axle 4 of a longitudinally-extending guiding means 5 rockingly mounted in the direction of travel of the vehicle. The guiding means or wheel-carrying arm 5 is fitted with a trunnion or shaft 6 which is rotatably secured in a pedestal bearing 7 (Fig. 4) and is held against axial displacement by a plate 8 and stud bolt, as shown. The bearing 7 supporting the arm 5 is bolted to the side wall 3 by stud bolts 19. The guiding means 5 is furthermore provided with or includes an arm 9 extending radially with respect to the axis of the shaft 6 and then inwardly parallel to the rocking or pivot axis $x$—$x$ of the shaft 6 and terminating in a cylindrical journal 10. The arms 9 and 5 enclose a solid angle $\alpha$ of preferably 60 degrees, as shown in Fig. 1.

One end of a tie-rod 11, forming a right angle with the arm 9 (Fig. 1), is pivotally secured on the journal 10 and held in place by a lock nut, as shown. The free end of the tie-rod carries a spring-retaining plate 12 secured by a lock nut, as shown in Fig. 3. A spring pack comprising a number of plate spring units 14 is clamped between the retaining plate 12 and an abutment 13 comprising a part of the pedestal bearing 7. The tie-rod 11 extends through a hole in the abutment 13. Each of the spring units, as shown in section in Fig. 3, comprises a concave ring plate 20, the curved outer rim of which receives the peripheral edge of a concave ring plate 21. The inner peripheries of the spring ring plates 20 and 21 are supported on shouldered ring supports 22 surrounding the tie-rod 11 in spaced relation. The spring pack extends generally in the same direction as the arm 5, but is mounted slopewise or at an incline with respect to the horizontal run of the track 2.

A holder bracket 16 is secured to the abutment member 13 above the tie-rod 11 on the side opposite the spring pack by means of screw studs 15. The free end 17 of the holder 16 extends out over the arm 5 in offset relation thereabove and carries a rubber buffer 18, which limits the vertical movement or stroke of the suspension arm 5.

In yieldably supporting the bogie-wheel 1, the suspension arm 5 rocks about the axis $x$—$x$ of the shaft 6, thereby positively acting on the arm 9, the tie-rod linked thereto and the spring pack carried on the tie-rod. The rocking movement of the arm 5 results in compressing or decompressing the plate springs 14, thereby providing a yieldable suspension for the bogie-wheel 1.

As shown particularly in Fig. 2, and due to the use of plate springs, and the space provided inside the rim of the wheel, it is possible to dispose of the members by which the bogie-wheel is guided and supported substantially protected within the confines of the wheel itself. Another advantage achieved by the invention is that the entire suspension mechanism, including the pedestal bearing member 7, may be dismounted from the frame of the vehicle as a unit by loosening and removing the screw bolts 19 by which the pedestal bracket 7 is secured to the vehicle.

I claim:

1. A tracked vehicle including a body having bogie wheel units mounted thereon, the combination in which at least one of said bogie wheel units comprises a readily detachable bearing bracket attached to and projecting from the side of the body of the vehicle, the bogie wheel unit being mounted on the body solely by means of its readily detachable bearing bracket, a suspension arm one end of which is pivoted to the bearing bracket on an axis transverse to the direction of travel of the vehicle, said suspension arm extending longitudinally of the vehicle from its pivoted end and terminating in a movable end, an outwardly projecting stub axle carried on the movable end of the suspension arm, a bogie wheel journaled on the stub axle, a second arm having one end fixed to the pivoted end portion of the suspension arm, the second arm extending upwardly from the pivoted end portion of the suspension arm at an acute angle thereto and terminating in a movable end, and spring means attached to the movable end of the second arm and arranged to yieldably bias the suspension arm downwardly to apply a load on the bogie wheel, said arms and spring means being located within the bounds of the inner rim portion of the bogie wheel and protected by the bogie wheel.

2. A tracked vehicle including a body having bogie wheel units mounted thereon, the combination in which at least one of said bogie wheel units comprises a readily detachable bearing bracket attached to and projecting from the side of the body of the vehicle, the bogie wheel unit being mounted on the body solely by means of its readily detachable bearing bracket, a suspension arm one end of which is pivoted to the bearing bracket on an axis transverse to the direction of travel of the vehicle, said suspension arm extending longitudinally of the vehicle from its pivoted end and terminating in a movable end, an outwardly projecting stub axle carried on the movable end of the suspension arm, a bogie wheel journaled on the stub axle, a second arm having one end fixed to the pivoted end portion of the suspension arm, the second arm extending upwardly from the pivoted end portion of the suspension arm at an angle of from about 60 to 65° with respect thereto with the apex of the angle at the pivot axis of the suspension arm, the second arm terminating in a movable end, a tie-rod journaled by one end to the movable end of the second arm, an abutment on the bracket, and a spring carried on the tie-rod under compression against said abutment and arranged to yieldably bias the suspension arm downwardly to apply a load on the bogie wheel, said arms, said tie-rod and spring means being located within the bounds of the inner rim portion of the bogie wheel and protected by the bogie wheel.

3. A tracked vehicle as claimed in claim 2, in which the second arm extends inwardly toward the body of the vehicle from a position above the suspension arm, and in which the tie-rod and spring extend downwardly from the position of attachment of the tie-rod to the movable end of the second arm.

4. A tracked vehicle including a body having bogie wheel units mounted thereon, the combination in which at least one of said bogie wheel units comprises a readily detachable bearing bracket attached to and projecting from the side of the body of the vehicle, the bogie wheel unit being mounted on the body solely by means of its readily detachable bearing bracket, a suspension arm one end of which is pivoted to the bearing bracket on an axis transverse to the direction of travel of the vehicle, said suspension arm extending longitudinally of the vehicle from its pivoted end and terminating in a movable end, an outwardly projecting stub axle carried on the movable end of the suspension arm, a bogie wheel journaled on the stub axle and including a rim extending inwardly over the suspension arm and over at least a portion of the bearing bracket, a second arm having one end fixed to the pivoted end portion of the suspension arm, the second arm extending upwardly from the pivoted end portion of the suspension arm at an acute angle thereto and including a portion extending laterally inwardly to a point inward of the suspension arm terminating in a movable end, a tie-rod journaled by one end to the movable end of the inwardly-extending portion of the second arm, and spring means carried on said tie-rod under compression against said bearing bracket as a stop and arranged to yieldably bias the suspension arm downwardly to apply a load on the bogie wheel, said arms, said tie-rod and spring means being located within the bounds of the inwardly-extending rim of the bogie wheel and protected by the bogie wheel.

References Cited in the file of this patent

UNITED STATES PATENTS

| 1,142,874 | Cannon | June 15, 1915 |
| 1,922,768 | Kegresse | Aug. 15, 1933 |
| 2,011,565 | Barnes | Aug. 20, 1935 |
| 2,417,715 | Stewart | Mar. 18, 1947 |
| 2,444,759 | Swennes | July 6, 1948 |
| 2,462,873 | Knox | Mar. 1, 1949 |
| 2,698,667 | Kropp | Jan. 4, 1955 |
| 2,719,062 | Arps | Sept. 27, 1955 |

FOREIGN PATENTS

| 349,400 | Germany | Mar. 2, 1922 |